United States Patent

Wolfe

[15] 3,694,530

[45] Sept. 26, 1972

[54] METHOD OF PRODUCING AN INTEGRAL SKIN POLYURETHANE FOAM

[72] Inventor: James D. Wolfe, North Canton, Ohio

[73] Assignee: The Goodyear Tire and Rubber Company, Akron, Ohio

[22] Filed: Nov. 17, 1969

[21] Appl. No.: 877,464

[52] U.S. Cl. ................264/48, 161/159, 161/161, 161/164, 260/2.5 AZ, 264/53, 264/54, 264/338, 264/DIG. 5, 264/DIG. 14
[51] Int. Cl. ..................B29d 27/04, C08g 22/44
[58] Field of Search.......264/45, 48, 54, 338, DIG. 5, 264/DIG. 14; 260/2.5 AZ

[56] References Cited

UNITED STATES PATENTS

| 3,394,207 | 7/1968 | Andersen...............264/338 X |
| 3,468,991 | 9/1969 | Krug............................264/45 |
| 3,473,951 | 10/1969 | Rossi et al.............264/45 UX |
| 2,639,252 | 5/1953 | Simon et al..................264/45 |
| 3,101,244 | 8/1963 | Hood et al. .............264/338 X |
| 3,210,448 | 10/1965 | Szabat.....................264/54 X |
| 3,413,390 | 11/1968 | Heiss.....................264/338 X |
| 3,501,564 | 3/1970 | Snoeyenbos et al. ...264/338 X |

FOREIGN PATENTS OR APPLICATIONS

| 664,192 | 6/1963 | Canada........................264/45 |
| 720,086 | 10/1965 | Canada........................264/45 |
| 898,242 | 6/1962 | Great Britain...............264/45 |

OTHER PUBLICATIONS

Frank, H. P. " Polypropylene." New York, Gordon and Breach Science Publishers, e1968, p. 17.
Knox, R. E. " Molding of Prepolymer Based Resilient Urethane Foam." In Rubber World, vol. 139, No. 5, February, 1969, pp. 685– 692.

Primary Examiner—Philip E. Anderson
Attorney—F. W. Brunner and J. D. Wolfe

[57] ABSTRACT

A method of producing integral skin polyurethane foams having densities as low as 1.0 to 3.0 lbs/ft$^3$ and surfaces which may simulate grain leather. The mold surface is first coated with a release agent, then a skin forming agent and then the foamable polyurethane reaction mixture is cast in the coated mold. Representative examples of the skin forming agents are polyester polyether and polyhydrocarbon polyols of two to 10 hydroxyls, hydroxyl containing polymers having a hydrocarbon, polyester or polyether backbone. The above skin forming agents may be applied to the mold surface by incorporation in a suitable solvent such as a low boiling liquid hydrocarbon or ketone. Polyurethane catalysts may also be added to the film forming agent solution. Another group of film forming agents which may be used are particulate materials which have the ability to absorb at least 0.5 grams of water per gram of material. Representative examples are sodium chloride, diatomaceous earth and talc.

1 Claim, No Drawings

METHOD OF PRODUCING AN INTEGRAL SKIN POLYURETHANE FOAM

This invention relates to foams of a polyurethane and more specifically to polyurethane foams of the integral skin type and to methods of producing said foam.

It is known that polyurethane foams tend to produce skins thereon with the nature of the skin varying from hard around the surface where the foam has been exposed to the atmosphere to those which have tissue-like skins that are readily torn. Consequently, there has been considerable research in attempting to develop polyurethane foaming recipes which produce polyurethane foam having a more satisfactory skin formed during the foaming operation. Unfortunately, those integral skin foams which have been satisfactory for commercial usage have densities that are relatively heavy and, therefore, the resulting foam with the integral skin is quite expensive relative to the conventional polyurethane foams which are formed without the integral skin.

Therefore, it is an object of this invention to provide a method of producing an integral skin foam wherein the foam may be of a lighter density than is currently being produced in integral skin foams and also to afford a method of effecting the nature of the skin without affecting the density in the interior of the foam.

These objects and other advantages of this invention can be more readily understood by reference to the working example and following discussion.

In general, these objects are accomplished by treating the surface of the mold with a skin forming agent, preferably incorporated in or upon a mold releasing agent and then adding to the mold the desired amount of a polyurethane foaming recipe and allowing the ingredients to react, foam and cure to obtain a foam having an improved skin thereon. Representative of the many skin forming agents that may be used in accordance with this invention are the reactive hydrogen containing materials preferably having a molecular weight in excess of about 800 if the skin is desired to be flexible or less than this value if the skin is desired to be relatively inflexible or rigid. Representative members of the reactive hydrogen containing materials are the polyester polyols of two to 10 hydroxyls and preferably three to four or higher, polyether polyols of two to 10 hydroxyls to facilitate the skin formation when the reactive hydrogen containing material is brought in contact with the polyurethane foaming recipe. also, the polyhydrocarbon polyols of similar hydroxyl value can be used as a film forming agent. Other reactive hydrogen containing materials beside the polyethers or polyester polyols are the polyhydrocarbon polyols such as the commercial products available as hydroxyl terminated polybutadiene or polystyrene-butadiene can be used, too. Also, the hydroxyl containing polycarbonates may be utilized.

Another class of film forming reagents that are especially useful in this invention is the amino or imino terminated or containing polymers having a hydrocarbon or polyester or polyether backbone. These backbones can contain atoms other than carbon or oxygen therein, for example, nitrogen and sulfur.

In general, the film forming agents may be applied to the mold surface in a suitable solvent such as a low boiling, liquid hydrocarbon or ketone and in a preferred embodiment the film forming agent is incorporated in the mold release agent, and this is applied to the surface of the mold in combination therewith.

Also, it is intended that suitable polyurethane catalysts may be incorporated in the film forming agent to enhance or control the speed of reaction and, thus, increase the rate of film formation on the surface of the mold. Also, this catalytic activity can be utilized to advantage in controlling the thickness of the skin formed on the mold and the porosity of the skin.

Representative classes of these catalysts are the organic tertiary amines and the organometallic compounds of Groups 1, 2, 3, 4, 5, 6, and 7 of the Periodic System.

Any of the usual polyurethane foaming recipes may be utilized with this invention. For instance, the recipe may comprise a reactive hydrogen containing material of about 700 to 4,000 molecular weight, an organic polyisocyanate and a suitable foaming agent such as water alone or one of the low boiling solvents such as methylene chloride or the fluorocarbons or combinations thereof. Also, the usual catalysts such as the tertiary amines or organic metallic catalysts such as stannous octoate or dibutyltin dilaurate can be utilized in the preparation of the foaming recipe along with the usual emulsifying agents such as the alkylene block copolymers of the silicones.

The nature of this invention can be more readily appreciated by reference to the following examples wherein all parts and percentages are by weight unless otherwise indicated.

EXAMPLE I

A low molecular weight polyethylene of the type utilized as a mold release agent was dissolved in sufficient hexane to give a polyethylene solution which could be readily sprayed or painted onto a metal mold to give satisfactory release when a polyurethane foaming recipe was added to the mold and allowed to foam and cure. To this polyethylene solution, about 5 to 10 percent of an amino terminated derivative of dimeric acid is added and the resulting solution is used to spray coat a mold which is allowed to stand at a temperature slightly above room temperature for the solvent to evaporate. The temperature may be adjusted upward to achieve a sweating to the surface of the amino derivative of the dimeric acid. The coated mold is passed beneath the mix head of an automatic foaming apparatus and sufficient foamable polyurethane mixture is added to fill the mold after the foamable mixture foams and cures. The mold is closed and the foamable mixture is allowed to foam and to expand to float the lid up away from the mold. The resulting foam is stripped from the mold to yield a shaped foam having an improved skin relative to one made without the use of the dimeric acid derivative as a film forming agent.

One may employ any of the aromatic, aliphatic, or heterocyclic compounds containing two primary or secondary amine groups, preferably separated by at least two carbon atoms. The diamines or higher amines may be substituted if desired with various non-interfering (non-functional) substituents such as ether radicals, thioether radicals, tertiary amino groups, sulphone groups, fluorine atoms, etc. Typical compounds in this category are listed below merely by way of illustration and not by way of limitation: Ethylene diamine, trimethylene diamine, tetramethylene diamine, hexamethylene diamine, octamethylene diamine, decamethylene diamine, N,N'-dimethyl-1,3-propanediamine, 1,2-diamino-2-methylpropane, 2,7-diamino-2,6-dimethyloctane, N,N'-dimethyl-1,6-hexanediamine, 1,4-diamino cyclohexane, 1,4-bis (aminomethyl) cyclohexane, 2,2'-diaminodiethyl ether, 2,2'-diaminodiethyl sulphide, bis (4-aminocyclohexyl) methane, N,N'-dimethyl-2,2,3,3,4,4-hexafluoropentane - 1,5 -diamine, ortho-, meta-, or paraphenylene diamine, benzidine, xylylene diamine, m-toluylene diamine, ortho-tolidine, piperazine, and the like. If desired, mixtures of different diamines may be used. It is generally preferred to use aliphatic alpha, omega diamines, particularly of the type

$H_2N-(CH_2)_n-NH_2$ wherein $n$ has a value of 2 to 12, preferably 6 to 10; or the cyclic ones such as diamino derivative of dimeric acid.

EXAMPLE II

Another mold is coated with the hexane-polyethylene solution of the amino derivative of dimeric acid which contained a 0.1 to 1 percent of a Schiff base formed from ethylene diamine and methylethyl ketone. A commercial seat cushion, one-shot polyetherurethane foamable reaction mixture is added to the mold and is allowed to react to form a cured foam. The Schiff base aided skin formation with a water containing foamable recipe.

Heretofore, the film producing agents have been described as those that were reactive with the isocyanate of the foaming recipe to produce polyurethane or polyurea. Another class of the film producing agents are those which exert a catalytic effect and reduce the density of the polyurethane foamable reaction mixture and thus produce a reduced degree of porosity in the interface between the foam and the skin. Representative members of those film producing agents of this type are those materials which have the ability to absorb appreciable amounts of water, usually to the degree of at least 0.5 and preferably 1 or more grams per gram of material. Representative of these materials are the powdered salts, capable of forming hydrates such as sodium chloride, are the diatomaceous earths available under the tradename "Micro-Cel E".

The foam producing agent of this invention may be utilized to advantage in the production of interior automobile decoration trim such as door panels, sun visors, the overhead padding in the top of the automobile. Examples of this use may be more readily seen in the following example.

EXAMPLE III

A silicone mold having the desired aesthetic and decorative or impressions therein, for instance a grain leather effect, is sprinkled with a water solution of sodium chloride approaching saturation and is placed in a heated oven to evaporate the water and achieve a degree of dehydration or dryness of the surface of the mold. A polyurethane foamable mixture containing water as the foaming agent is poured into the mold and is allowed to cure. The cured foam is removed from the mold to expose a skin superior to that obtained when using the same recipe without the salt treatment.

The use of a treating agent of the water absorbent type tends to produce a skin having a flat rather than a high gloss appearance, and thus these treating agents would be preferred where a flat texture is desired.

Instead of the salt solution, the silicone mold may be covered with diatomaceous earth such as Johns Manville's "Micro-Cel E", or talc to produce a foam having a different skin texture.

EXAMPLE IV

The silicone mold of Example III is painted with an epoxy resin dissolved in hexane and the hexane is allowed to evaporate to leave a coating of the epoxy resin on the silicone mold. A commercial seat cushion polyetherurethane foam is added to the mold to foam and cure. The cured foam is stripped from the silicone mold to expose a foam having an improved skin thereon. A relatively high catalyst level where the catalyst is an amine or tertiary amine is desirable in these foam recipes.

It should be emphasized that when using a reactive material such as the diglycydil ether of bisphenol or any of the other epoxy resins listed in U.S. Pat. No. 3,148,167, it is a desired feature of this invention that the amount of isocyanate in the polyetherurethane foamable recipe be sufficient relative to the ratio of isocyanate to the reactive hydrogen containing material in the skin area to give an excess or some free isocyanate radicals in the surface area. An excess of isocyanate over the reactive hydrogen containing material in the surface area yields a skin with superior properties and with freedom from the tendency to be tacky for long periods after the foam is produced.

The skin can be further improved by use of amines in the foaming recipe that catalyzes or activates the cure of the epoxy resin.

A silicone mold having the surface texture of a high grade leather and the shape of an automobile top cover or pad is coated with a suitable film forming agent and then sufficient foamable polyetherurethane reaction mixture is added to the mold and permitted to foam and fill the mold while retained in a restraining mold. The foam is stripped from the mold and is given a coat (preferably 2 to about 10 mils) of a non-discoloring polyurethane to yield an automobile cover or pad for the top interior thereof. The non-discoloring urethanes preferably are the reaction product of a reactive hydrogen material of 700 or higher molecular weight, an organic polyisocyanate and diamine with the proviso that the isocyanate groups and the amino groups are attached to a non-benzoid carbon atom.

Thus, this method of producing foams having improved skins permits foams to be made having densities of 1.0 to 3.0 pounds per cubic foot, as well as higher densities.

Also, it should be emphasized that the polyurethanes may be made by the prepolymer, quasi-prepolymer or one-shot method in accordance with usual practices where the isocyanate is preferably used in excess and the diamine never exceeds over 1.1 mols for each mol of isocyanate. The usual catalysts such as organictin compounds or the amine catalyst can be used with the usual polyurethane emulsifiers such as the silicones. Also, the catalyst can be used to advantage with the film forming agent.

The polyol materials of U.S. Pat. Nos. 3,049,513, 3,049,514, 3,049,515 and 3,049,516 are particularly desirable for use as a film forming agent. Any of the polyurethane foamable recipes may be used in the practice of this invention. The polyester polyols, polyetherpolyols and hydrocarbon polyols of 800 to 4,000 molecular weight in conjunction with an organic polyisocyanate and a blowing agent are normally used to produce the foamable mixture.

While certain representative embodiments and details have been shown for the purpose of illustrating the invention, it will be apparent to those skilled in this art that various changes and modifications may be made therein without departing from the spirit or scope of the invention.

What is claimed is:

1. In a method for producing a polyurethane foam having an improved skin relative to the skin formed without treating the mold surface with an agent which causes a skin to form when in contact with a polyurethane foamable reaction mixture containing water as the foaming agent, the improvement comprising coating the mold surface with a particulate agent having the ability to absorb at least 0.5 grams of water per gram of agent and diatomaceous earth and talc and selected from the class consisting of salt, which causes a skin to form when in contact with a polyurethane foamable reaction mixture, permitting the agent to absorb at least 0.5 grams of water per gram of agent and then adding the polyurethane foamable reaction mixture to the mold and effecting foaming of said mixture to produce a foam having an improved polyurethane skin.

* * * * *

PO-1050
(5/69)

UNITED STATES PATENT OFFICE
CERTIFICATE OF CORRECTION

Patent No. 3,694,530            Dated September 26, 1972

Inventor(s) James D. Wolfe

It is certified that error appears in the above-identified patent and that said Letters Patent are hereby corrected as shown below:

Column 6, line 10, after "agent and" delete "diatomaceous earth and talc and";

Column 6, line 11, after "salt," insert -- diatomaceous earth and talc and --.

Signed and sealed this 29th day of May 1973.

(SEAL)
Attest:

EDWARD M. FLETCHER, JR.
Attesting Officer

ROBERT GOTTSCHALK
Commissioner of Patents